United States Patent

Le Traon et al.

[11] Patent Number: 5,962,786
[45] Date of Patent: Oct. 5, 1999

[54] MONOLITHIC ACCELEROMETRIC TRANSDUCER

[75] Inventors: Olivier Le Traon, Vauhallan; Denis Janiaud, Les Ulis; Serge Muller, Ollainville, all of France

[73] Assignee: ONERA (Office National d'Eudes et de Recheres Aerospatiales), Chatillon, France

[21] Appl. No.: 09/027,859

[22] Filed: Feb. 23, 1998

Related U.S. Application Data

[63] Continuation of application No. PCT/FR96/01481, Sep. 23, 1996.

[30] Foreign Application Priority Data

Sep. 26, 1995 [FR] France ................................ 95 11365

[51] Int. Cl.⁶ .................................................. G01P 15/08
[52] U.S. Cl. .................................... 73/514.29; 73/514.15; 73/862.59; 310/323
[58] Field of Search ........................... 73/514.29, 514.15, 73/514.18, 514.16, 862.59; 310/321, 323, 338, 25

[56] References Cited

U.S. PATENT DOCUMENTS

| | | | |
|---|---|---|---|
| 4,215,570 | 8/1980 | Eer Nisse . | |
| 4,446,394 | 5/1984 | Albert | 310/321 |
| 4,594,898 | 6/1986 | Kirman et al. . | |
| 4,699,006 | 10/1987 | Boxenhorn | 73/514.15 |
| 4,945,765 | 8/1990 | Roszhart | 73/514.29 |
| 5,170,665 | 12/1992 | Janiaud et al. | 73/514.29 |
| 5,331,853 | 7/1994 | Hulsing, II | 73/514.29 |
| 5,456,110 | 10/1995 | Hulsing, II | 73/514.35 |

FOREIGN PATENT DOCUMENTS

| | | |
|---|---|---|
| 414588 | 2/1991 | European Pat. Off. . |
| 614087 | 9/1994 | European Pat. Off. . |
| 620415 | 10/1994 | European Pat. Off. . |
| 2528183 | 12/1983 | France . |
| 2688954 | 9/1993 | France . |
| 2685964 | 6/1996 | France . |
| 2162314 | 1/1986 | United Kingdom . |
| WO89/10568 | 11/1989 | WIPO . |
| WO94/14076 | 6/1994 | WIPO . |

*Primary Examiner*—Hezron Williams
*Assistant Examiner*—Helen C. Kwok
*Attorney, Agent, or Firm*—Laubscher & Laubscher

[57] ABSTRACT

A monolithic accelerometric transducer comprises a fixed part, two mobile mass parts and a resonator having ends fastened to said mobile parts, a flexible frame around the two mobile parts, and two connecting members connecting the frame to the second mobile part and to the fixed part. The frame provides a mechanical filter between the resonator and the fixed part which is not affected by the vibrations of the resonator. The quality factor Q of the resonator is not degraded and the measurement provided by the transducer is more accurate. In a differential output accelerometer, the position of the transducer is deduced from that of another, identical transducer by rotation of 180° about an axis parallel to the resonator, the fixed parts of the transducers being fastened together.

13 Claims, 10 Drawing Sheets

MONOLITHIC ACCELEROMETRIC TRANSDUCER

REFERENCE TO RELATED APPLICATION

This application is a continuation application based on the PCT No. PCT/FR96/01481 filed Sep. 23, 1996, which is based on the French application Ser. No. 95/11365 filed Sep. 26, 1995.

BACKGROUND OF THE INVENTION

1. Field of the Invention

The present invention concerns a monolithic accelerometric transducer comprising a fixed part, a mobile mass part and a resonator having one of its two ends fastened to the mobile mass part.

The transducer is intended for a differential output accelerometer, for example. In particular, the invention provides a miniature accelerometer of low cost that can be used for navigation in aircraft and helicopters, for guiding missiles and for the active suspension of terrestrial vehicles, for example.

The resonator constituting the responsive member of the transducer of the invention is preferably a flexional or torsional vibratory blade of a piezoelectric material. The vibration frequencies of the blade are highly sensitive to the tensile or compression force exerted longitudinally on the blade when the mobile mass part constituting the inertial mass is subjected to acceleration. The extension or the compression of the blade is converted into electrical signals that are picked up by electrodes supported by the vibratory blade and connected to an oscillator circuit for example. A signal is produced at the output of the oscillator circuit, the frequency variations of the signal being representative of those of the acceleration.

Compared to conventional accelerometric sensors with an analog output (for example an electrical voltage), accelerometers with a frequency output have the advantage of potentially greater performance since frequency is readily processed in digital form.

Another important aspect is the monolithic nature of the transducer, which enables miniature accelerometers to be fabricated at relatively low cost by chemical machining and which promotes good performance since the process of assembling together component parts generally constitutes a major limitation of non-monolithic transducers.

The materials most frequently used to fabricate monolithic transducers are quartz and silicon, which are appreciated for the excellent stability of their mechanical characteristics.

2. Description of the Prior Art

Figure 1:
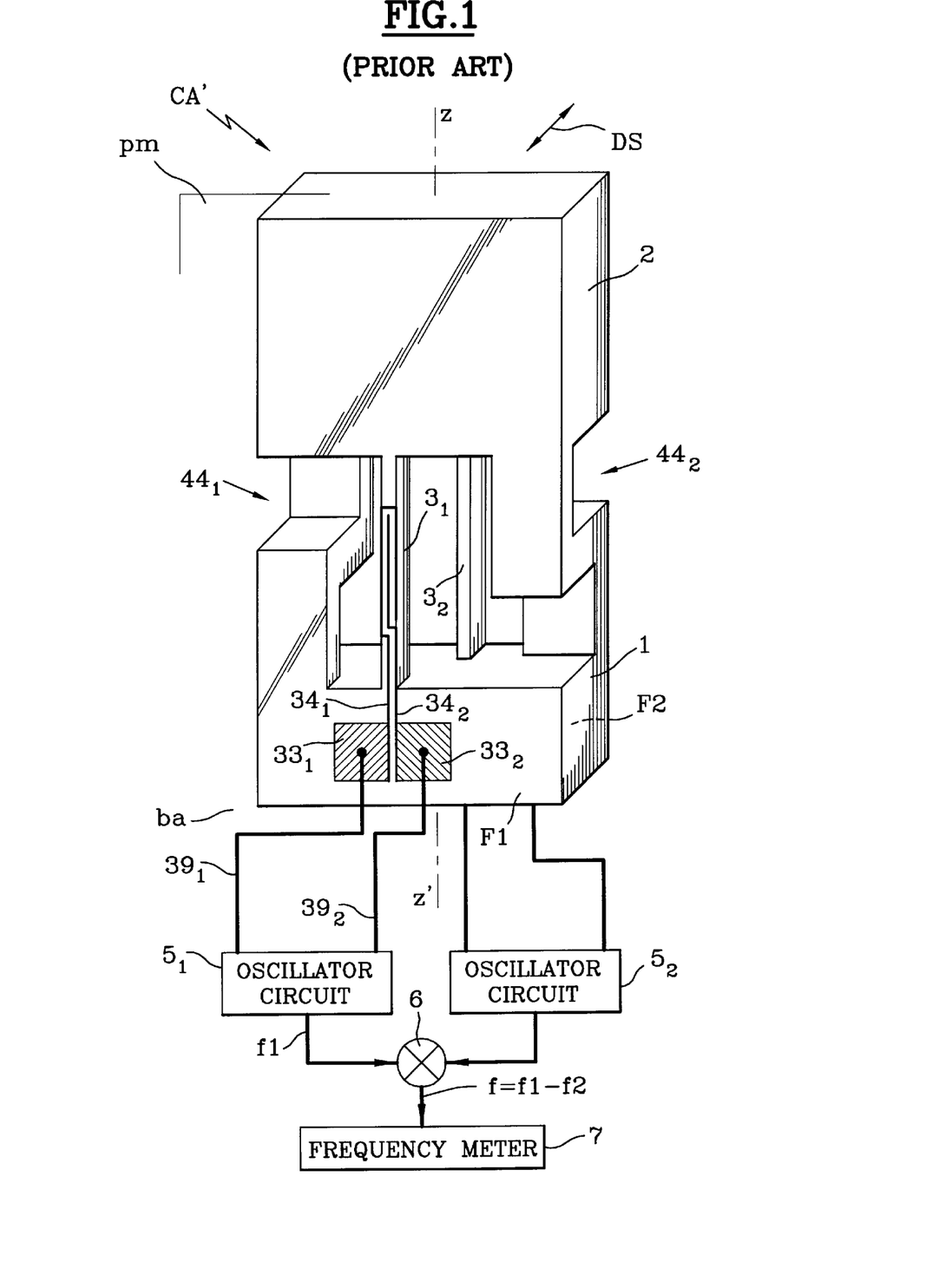

As described in French patent application No. 2,685,964 in the name of the applicant, the body of an accelerometer CA' shown in FIG. 1 is monolithic and is obtained by chemical machining of piezoelectric crystals such as quartz. The body of the accelerometer CA' is generally parallelepiped shape and comprises a fixed mass part 1 fastened to a base ba, a mobile mass part 2, two vibrating blades $3_1$ and $3_2$ and two flexible hinges $44_1$ and $44_2$. The accelerometer body CA' is symmetrical about the central longitudinal axis z'z.

The blade $3_1$ is a beam having a small rectangular cross-section and flexional vibration of which is excited piezoelectrically by two metal electrodes $34_1$ and $34_2$ of opposite polarities. These electrodes are printed by a photolithographic process onto the external longitudinal side of the blade and terminate on the corresponding face F1 of the fixed part 1 in two conductive plates $33_1$ and $33_2$ connected to two first terminals of an oscillator circuit $5_1$ by means of two conductor wires $39_1$ and $39_2$. An identical arrangement of electrodes and plates is provided on the blade $3_2$ and the opposite face F2 of the fixed part 1, in relation to a second oscillator circuit $5_2$.

The outputs of the two oscillator circuits $5_1$ and $5_2$ are connected to a differential frequency measuring device including a frequency subtractor circuit 6 and a frequency meter 7, the frequency (f1–f2) measured by the frequency meter 7 being representative of the acceleration to be measured.

With reference to the mechanical design of the prior art accelerometer CA', the two hinges $44_1$ and $44_2$ are flexible in the sensitive direction DS perpendicular to the mid-plane pm of the body. If the accelerometer is subject to an acceleration in this sensitive direction DS the blades $3_1$ and $3_2$ are extended and compressed, i.e. they are subject to axial forces in opposite directions and proportional to the acceleration. This causes frequency variations of opposite signs for the two blades and, if the two blades are identical, frequency variations of the same magnitude. On the other hand, spurious input magnitudes such as the temperature generally have common mode effects on the two blades and cause frequency variations of the same sign. The benefit of the differential output $(f_1-f_2)$ is that it attenuates input magnitudes other than the acceleration in the sensitive direction DS.

The particular staircase shape of the hinges $44_1$ and $44_2$ allows chemical machining of the body CA' in a single step with the same depth of machining from the two faces F1 and F2 of the body of the transducer parallel to the plate pm.

The mechanical design of the prior art accelerometer CA' has disadvantages, in particular with regard to vibration of the two blades $3_1$ and $3_2$. First of all, mechanical loads such as the shear force and the bending moment where the two blades $3_1$ and $3_2$ are "built into" the fixed mass part 1 and generated by the vibrations of the two blades cause leakage of vibratory mechanical energy towards the base ba attached to it. This reduces the quality factor Q of the vibration of each of the blades $3_1$ and $3_2$. Secondly, the mechanical loads where these blades are "built into" the mobile part 2 and generated by their vibration cause small vibrational displacements of said mobile part at the same frequency as the vibrations of the blades $3_1$ and $3_2$. This results in mechanical coupling between the vibrations of the two blades, which disturbs their vibration. These two drawbacks affect the accuracy of the measured differential frequency (f1–f2) and therefore the value of the acceleration deduced therefrom.

Figures 2, 3:
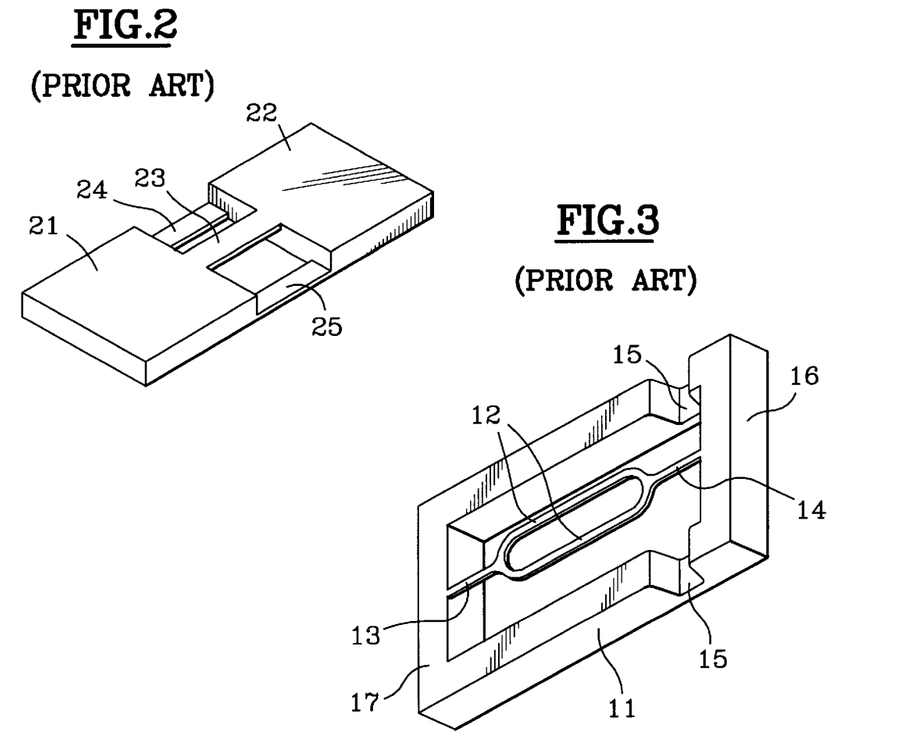

FIG. 2 shows a second monolithic transducer disclosed in patent application WO 89/10568. The body of this second transducer made by chemical machining of a silicon wafer comprises a fixed part 21, an inertial mass 22 and three flexional vibratory resonators (filaments) 23, 24 and 25 excited by thermo-mechanical means, for example using heater elements (not shown) obtained by ion implantation on each resonator. The sensitive direction of this second prior art transducer is perpendicular to the faces of the wafer. The output signal of the transducer is a function of a linear combination of the frequencies of the three resonators 23, 24 and 25 independent of accelerations perpendicular to the sensitive direction.

The major disadvantage of the second prior art transducer is mechanical coupling between the vibrations of the three resonators, which affects the accuracy of the transducer.

FIG. 3 shows the body of a third monolithic transducer obtained by chemical machining of a silicon plate as disclosed in U.K. patent application No. 2,162,314. The body of the third transducer comprises a supporting frame 11 having flexible thin portions 15, and a resonator in the form of a double ended tuning fork constituted of two filaments 12 vibrating in antiphase and two root portions 13 and 14 attached to the supporting frame. The root portion 14 is connected to a fixed part 16 of the supporting frame and the other root portion 13 is connected to a U-shape mobile part 17 of the supporting frame constituting the inertial mass. The fixed and mobile parts 16 and 17 are connected together by the flexible portions 15 constituting hinges.

A first disadvantage of the third prior art transducer concerns the inadequate confinement of the vibratory mechanical energy in the two filaments 12, given the low mass of the mobile part 17.

A second disadvantage of the third prior art transducer concerns the location of the hinges 15 of the inertial mass 17, which is prejudicial to the thermo-mechanical behavior of the transducer when it is subjected to rapid variations in temperature. In this case, a difference appears between the temperature $\theta_1$ of the fixed part 16 and the temperature $\theta_2$ of the inertial mass 17, because these two parts are connected by the resonator 12 and the hinges 15, which can be regarded as thermal filters because of their small cross-section. The mean temperature of the resonator 12 is then substantially equal to that of the hinges 15 and is substantially equal to $(\theta_1+\theta_2)/2$. The position of the hinges 15, parallel to the filaments 12, is substantially vertically in line with the root portion 14 of the resonator and accordingly the parallel branches of the U-shape inertial mass 17 extend substantially the entire length of the resonator. Accordingly, thermal expansion of the resonator and of the supporting frame 11 are not balanced and induce tensile or compression mechanical stresses in the resonator with a variation in frequency that is incorrectly interpreted as an acceleration.

Figure 4:
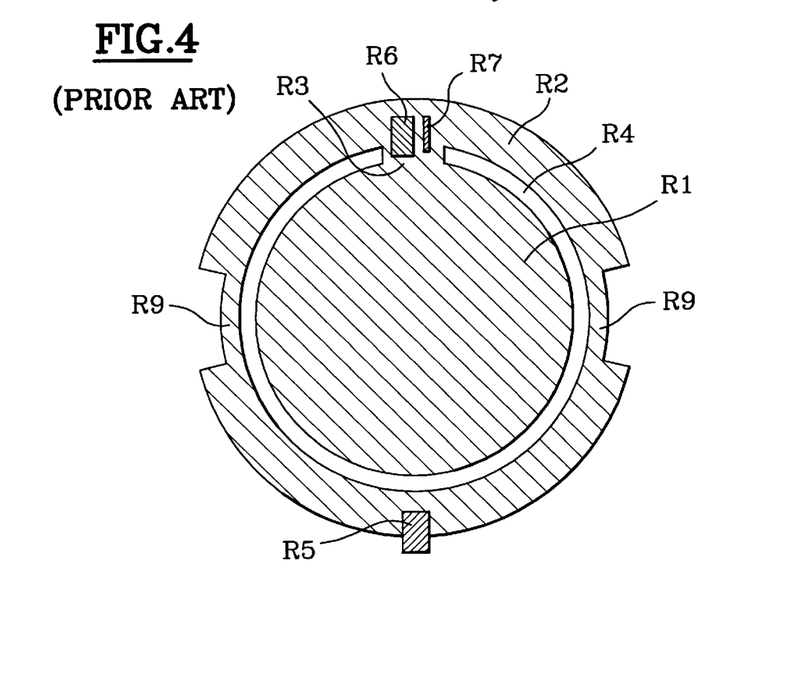

FIG. 4 shows a prior art resonator for a thermostatically controlled oscillator featuring low power consumption and rapid heating as described in French patent application No. 2,688,954. Unlike the prior art acceleration transducers described previously, this resonator is designed to deliver a signal having a frequency that must be as stable as possible and which must therefore be relatively insensitive to acceleration. Thus the functions of the resonator are different from those of the transducer of the present invention.

From the structural point of view, the resonator shown in FIG. 4 comprises a central part R1 and a peripheral part R2 forming a ring surrounding the central part at a small radial distance and joined to the latter by an intermediate part R4 wherein an opening is formed. The peripheral part R2 is connected to the central part R1 by a single connecting bridge R3 which is constituted by the solid part of the intermediate part R4 and which extends over a small fraction of this intermediate part R4.

The central part R1 constitutes the active vibratory part of the resonator and the peripheral part R2 is immobilized in a casing by attached fixing means R5 such as a clamp located in an area of the peripheral part R2 opposite the single connecting bridge R3 relative to the active central part R1.

This embodiment with a single connecting bridge channels conducted heat flux and provides good control of the temperature of the resonator, by means of a heater element R6 and temperature sensor R7 at the level of the connecting bridge R3. The active central part R1 vibrates in shear in the direction of the thickness at a frequency in the order of 10 MHz. The vibratory mechanical energy is confined in the central part by virtue of the convex shape of at least one of the two major faces of the central part.

OBJECT OF THE INVENTION

The main object of this invention is to remedy the disadvantages of the prior art transducers previously described by providing a monolithic transducer for differential accelerometers, the geometrical structure of which avoids leakage of vibrational mechanical energy from the resonator to the fixed part of the transducer. The quality factor Q of the resonator is not degraded and mechanical coupling with another analogous resonator is eliminated, which improves the accuracy of the accelerometer.

SUMMARY OF THE INVENTION

Accordingly, the transducer according to the invention is characterised in that it comprises a second mobile mass part fastened to the other end of the resonator, a flexible frame around the two mobile mass parts, a first connecting member connecting the frame to the second mass mobile part and a second connecting member connecting the frame to the fixed part.

Thus, the flexibility of the frame and the location of the two mobile mass parts within the frame provide a mechanical filter between the resonator and the fixed part of the transducer, the fixed part being subjected to practically no vibration from the resonator. There is virtually no degradation of the quality factor Q of the resonator and the accuracy of the measurement provided by the transducer is improved accordingly.

According to a prefered embodiment, the flexible frame is rectangular and comprises two sections substantially parallel to the resonator, and two other sections substantially perpendicular to the resonator and respectively connected to the second mobile mass part and to the fixed part by the first and second connecting members, the first connecting member having a width less than the width of the second mobile mass part, and the second connecting member having a width less than the length of the other sections, the widths being those in the lengthwise direction of the other sections, at least one of the connecting members preferably having a cross-section in the same order of magnitude as those of the frame sections.

To obtain maximal efficiency of the mechanical filter, the two mobile mass parts, the resonator, the flexible frame and the two connecting members have preferably a common plane of symmetry perpendicular to the plane of the frame, the two connecting members being located at respective intersections of the frame and the plane of symmetry.

According to other features of the invention, the monolothic body of the transducer comprises two coplanar blades each having ends fastened to the two mobile mass parts, respectively, and disposed one on each side of the resonator. Theses blades can have a length substantially less than that of the resonator, in order to promote the mechanical robustness of the transducer. The position of the blades is substantially in the middle of the length of the resonator to prevent rapid variation of temperature inducing unwanted mechanical stresses.

In order to machine chemically the monolithic body of the transducer in one step from a plate of material of uniform thickness, the blades are flush with one face of said plate, i.e. a face common at least to the mobile mass parts, the resonator is flush with the other face of the plate, i.e. another face common at least to the mobile mass parts, and the blades and the resonator have a common width in the direction of the thickness of the mobile mass parts.

The fixed part can be inside the frame in order further to miniaturize the transducer.

The invention also concerns a differential output type accelerometer comprising two acceleration transducers of the invention. The position of the second transducer is deduced from that of the first transducer by rotation of 180° about an axis parallel to an axis passing through the ends of the resonator of the first transducer, the fixed parts of the two transducers being fastened together to a common base.

According to a first preferred embodiment, the transducers are symmetrical to each other about a plane parallel to coplanar faces of the mobile mass parts of each of the transducers.

According to a second preferred embodiment, the mobile mass parts, the frames and the fixed parts of the transducers have coplanar faces, the transducers preferably being symmetrical to each other about an axis parallel to the coplanar faces.

BRIEF DESCRIPTION OF THE DRAWINGS

Other features and advantages of the present invention will be apparent more clearly from the reading of the following detailed description of several embodiments of the invention with reference to the corresponding accompanying drawings wherein:

FIGS. 1, 2 and 3 are perspective views of three prior art monolithic accelerometric transducers already commented on;

FIG. 4 is a top view of a prior art resonator already commented on;

DESCRIPTION OF PREFERRED EMBODIMENTS

Figure 5:
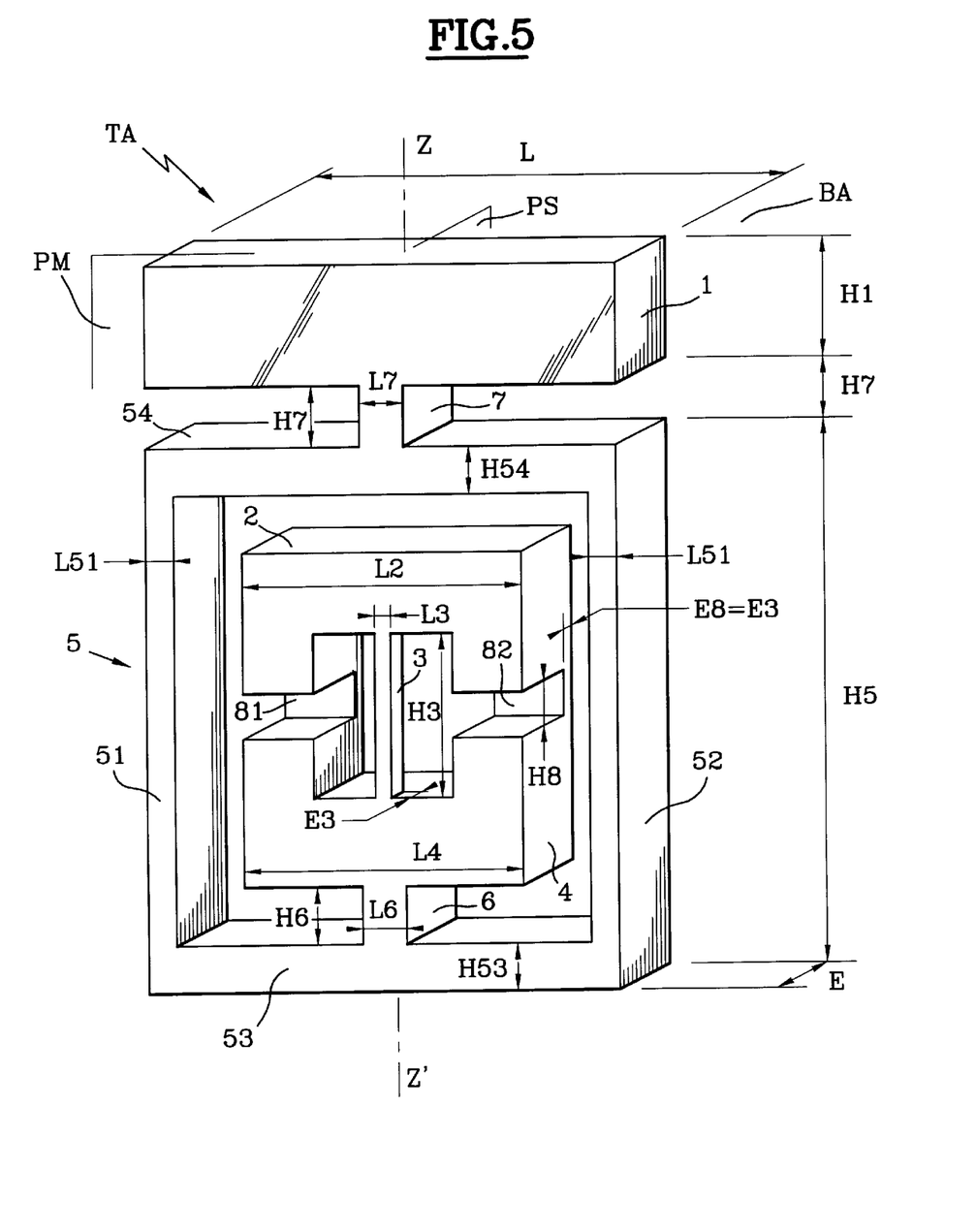
FIG. 5 is a perspective view of an accelerometric transducer constituting a first embodiment of the invention.

Referring to FIG. 5, an accelerometric transducer TA of the invention essentially comprises a fixed part 1, a first mobile mass part 2 constituting the inertial mass, a resonator 3 constituting the sensitive member, a second mobile mass part 4, a flexible frame 5 and two connecting members 6 and 7.

In the embodiment shown in FIG. 5 the transducer TA constitutes a monolithic body machined from a single plate of a material such as quartz or silicon with a uniform thickness E, width L and height H1+H7+H5. The transducer TA has the general shape of a parallelepiped which extends vertically along the heightwise direction indicated by a central longitudinal axis Z'Z. This axis Z'Z lies in a mid-plane PM of the plate parallel to the faces of the latter and in a plane PS perpendicular to the faces of the plate. The plane PS is a plane of symmetry of the transducer.

The fixed part 1 constitutes a parallelepiped shape block disposed at one longitudinal end of the body of the transducer and is adapted to be attached to the structure of an engine (not shown) by means of a case base BA. The fixed part 1 is fixed, for example glued, to the base BA.

The mobile parts 2 and 4 are each generally U-shape with the two parallel branches disposed parallel to the central longitudinal axis Z'Z of the transducer. The cores of the U shapes of the mobile parts 2 and 4 are perpendicular to the axis Z'Z and facing each other. The mobile part 2 is nearer the fixed part 1 than the mobile part 4. In the embodiment shown, at least the widths L2 and L4 of the mobile parts 2 and 4 are equal.

In the embodiment shown, the resonator 3 is a parallelepiped shape blade having a length H3 parallel to the axis Z'Z and a rectangular cross-section defined by a thickness E3 and a width L3 which are respectively less than and in the same direction as the thickness E and the width L of the transducer TA, respectively. The ends of the resonator 3 are fastened to the respective mobile parts 2 and 4 and are situated on the facing plane faces of the cores of the mobile parts. One side of the resonator 3 facing towards the outside of the body is coplanar with the corresponding large faces of the parts 1, 2 and 4 of the transducer TA and therefore of the corresponding face of the plate of material.

The resonator 3 has electrodes (not shown) for causing it to vibrate at its resonant frequency and adapted to be connected to an oscillator and to a frequency measuring circuit. The resonator 3 preferably vibrates flexionally or torsionally, as the frequencies of such vibrations are highly sensitive to the tensile or compression force exerted longitudinally on the resonator when the mobile mass part 2 constituting the inertial mass is subjected to an acceleration.

The resonator 3 can have other constitutions than that of the parallelepiped shape blade of the embodiment shown in FIG. 5. For example, the resonator 3 may be of the double tuning fork type with two or three blades as described in the prior art documents, U.S. Pat. No. 4,215,570 (EER NISSE) and U.S. Patent No. 4,594,898 (KIRMAN et al.).

With reference to the electrodes for causing the resonator 3 to vibrate, various constitutions are possible depending on the nature of the material constituting the monolithic body of the transducer. In the case of a piezoelectric material such as quartz, for example, it is advantageous to use electrode configurations with two or three conductive strips as described in French patent application No. 2,685,964 in the name of the applicant. Other means of imparting vibration may equally well be used, for example means based on the electrostatic effect.

With reference to the resonator 3 and the electrodes for imparting vibration to it, it must be understood that the scope of the present patent application encompasses such variants and more generally any others constituting equivalents.

In the embodiment shown in FIG. 5, the flexible frame 5 has a rectangular front contour and is made up of four sides formed by parallelepiped shape sections 51, 52, 53, 54. The length H5 of the sections 51 and 52 is parallel to the axis Z'Z and their rectangular cross-sections are defined by a common thickness L51 and a common width E respectively in the directions of the width L and the thickness E of the transducer TA. The sections 53 and 54 have the same length L in the direction of the width L of the transducer TA. The section 53 is at the longitudinal end of the transducer opposite that at which the fixed part 1 is disposed. The section 54 is disposed between the fixed part 1 and the core of the first mobile part 2. The rectangular cross-sections of the sections 53 and 54 are defined by thicknesses H53 and H54 parallel to the axis Z'Z and by a common width E in the direction of the thickness E of the transducer.

The flexible frame 5 surrounds the mobile parts 2 and 4 and is connected to the mobile part 4 by the connecting member 6 and to the fixed part 1 by the connecting member 7.

In the embodiment shown in FIG. 5 the connecting member 6 constitutes a parallelepiped shape block with dimensions H6, L6 and E in the directions of the axis Z'Z, the width L and the thickness E of the transducer TA, respectively. The connecting member 6 is attached to the section 53 of the frame 5 and to the mobile second part 4.

The connecting member 7 constitutes a parallelepiped shape block with dimensions H7, L7 and E in the directions of the axis Z'Z, the width L and the thickness E of the transducer TA, respectively. The connecting member 7 is attached to the section 54 of the frame 5 and to the fixed part 1.

The planes PM and PS are planes of symmetry of each of the connecting members 6 and 7.

The monolithic body of the transducer TA also includes two identical and coplanar parallelepiped shape blades 81 and 82 disposed one on each side of the resonator 3. Each of the blades 81 and 82 has ends fastened to the mobile parts 2 and 4, respectively. The length H8 of the blades 81 and 82 parallel to the axis Z'Z is substantially less than the length H3 of the resonator, which imparts to the blades a high flexural stiffness, promoting the mechanical robustness of the transducer TA. The length H8 of the blades is generally between H3/10 and H3/2.

The position of the blades 81 and 82 parallel to the axis Z'Z is preferably substantially in the middle of the length H3 of the resonator 3, so that the U-shape mobile parts 2 and 4 have branches parallel to the axis Z'Z of substantially equal length. This position of the blades prevents the resonator from being subjected to unwanted mechanical stresses when the temperature of the transducer TA is not uniform, as is the case when the case base BA is subjected to rapid variations of temperature. In this case a difference arises between the temperatures of the mobile parts 2 and 4, the mean temperature of the resonator being substantially equal to that of the blades 81 and 82 and having a value substantially equal to the mean of the temperatures of the two mobile parts.

If the blades were not substantially in the middle of the length H3 of the resonator 3, thermal expansions, along the axis Z'Z of the resonator, of the blades and of the mobile parts would not be balanced. This would cause tensile or compression mechanical stresses in the resonator with a corresponding frequency variation that would be incorrectly interpreted as an acceleration. The positioning of the blades substantially in the middle of the length H3 of the resonator in accordance with the invention avoids this disadvantage.

In the embodiment illustrated in FIG. 5, the faces of the blades 81 and 82 facing towards the exterior of the body of the transducer are coplanar with a face common to the mobile mass parts 2 and 4 and more generally to a face of the plate of material, the side of the resonator 3 facing towards the exterior of the body being coplanar with the other face of the plate. The blades 81 and 82 have a thickness E8 in the direction of the thickness E of the plate equal to the thickness E3 of the resonator. Moreover, the thickness E3=E8 of the resonator and of the blades is less than half the thickness E of the plate. The thickness E3=E8 is generally between E/20 and E/4.

The shapes and the dimensions of the resonator and of the blades allow chemical machining in a single step to fabricate the monolithic body of the transducer TA. To this end, and prior to the chemical machining, the two faces of the plate of material are each protected by a mask having a geometrical pattern that is the same as the face pattern of the transducer. Accordingly, the fixed part 1 and the mobile parts 2 and 4, the flexible frame 5 and the connecting members 6 and 7 are protected on both faces whereas the resonator 3 and the blades 81 and 82 are protected only on their faces which face towards the exterior of the body of the transducer. Chemical machining is then effected simultaneously from both faces of the plate to an etching depth (E−E3). Since E3 is less than E/2, the etching depth (E−E3) is greater than E/2 and accordingly sufficient material is removed to machine as far as the etched locations from both faces of the plate, for example between the mobile part 2 and the section 54 of the flexible frame 5.

The operation of the transducer is described next with reference to FIGS. 6A and 6B, which show the advantages of the particular arrangement of the mobile part 4, the flexible frame 5 and the connecting members 6 and 7, and FIGS. 7A, 7B and 7C, which illustrate the mechanical behavior of the mobile part 2, the resonator 3 and the blades 81 and 82 of the transducer when subjected to three spatial components of acceleration.

Figure 6A:
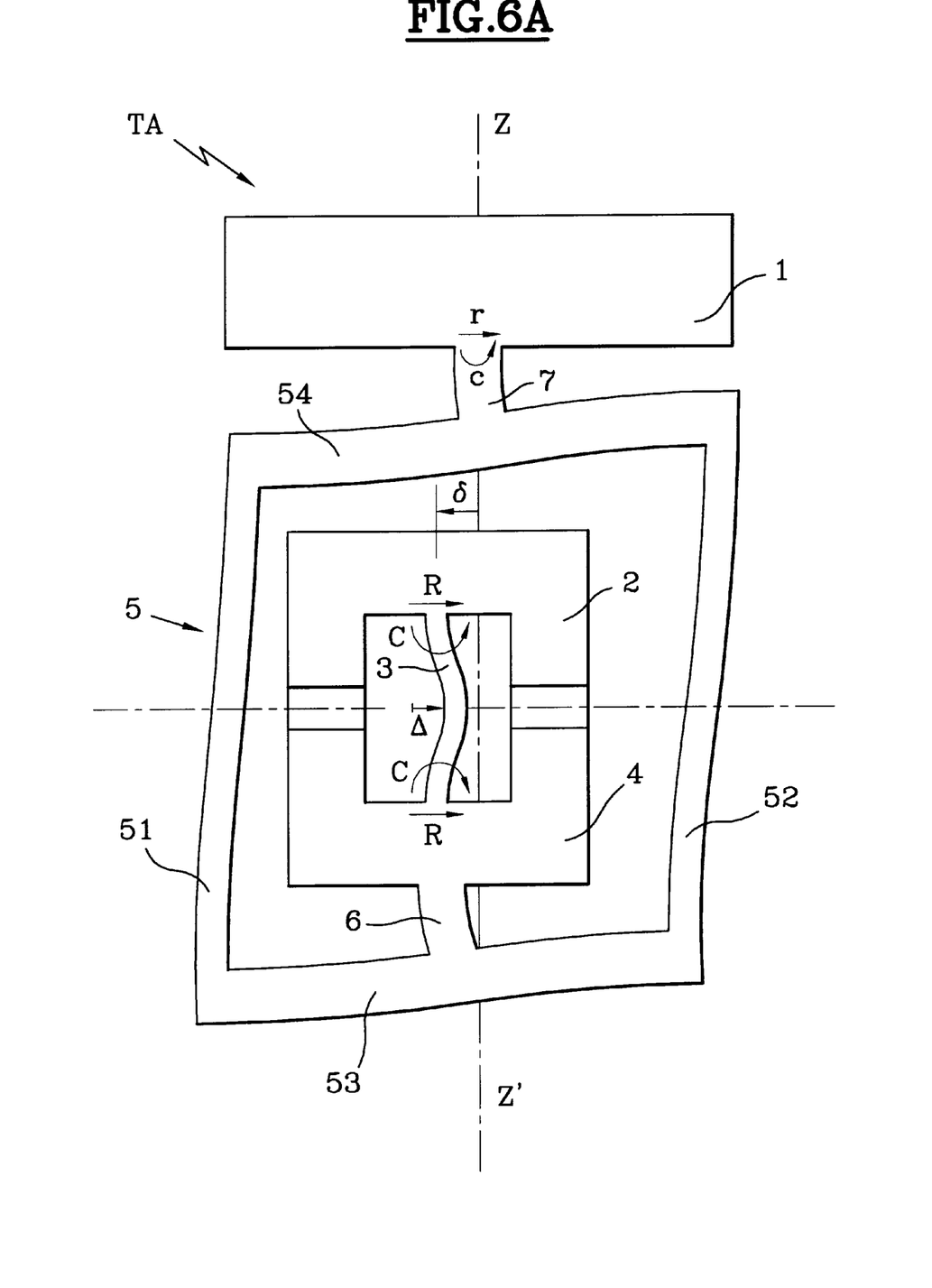
FIGS. 6A and 6B are front and perspective views of the transducer from FIG. 5 wherein the deformations of the transducer when the resonator of the transducer is respectively subjected to flexional vibration and torsional vibration, have been exaggerated.

FIG. 6A is a face view of the transducer TA from FIG. 5 when the resonator 3 is subject to flexional vibration parallel to the faces of the plate of material. The deformations of the resonator 3, the flexible frame 5 and the connecting members 6 and 7 correspond to the amplitudes of the vibration and have been exaggerated to make the drawing easier to understand.

The interpretation of these vibratory phenomena is as follows.

When the resonator 3 is subject to flexional vibration at its resonant frequency, it applies at its "built in" ends an alternating shear force R and an alternating bending moment C to each of the mobile parts 2 and 4 which are therefore subjected to alternating displacements the main component δ of which is a translation parallel to the faces of the plate and perpendicular to the central longitudinal axis Z'Z. To make the drawing easier to understand, the displacement δ of the mobile parts has been shown as greater than the amplitude Δ of vibration of the resonator. In reality, δ is much smaller than Δ, since the mass of the mobile parts is much greater than that of the resonator. This small alternating displacement δ of the mobile parts 2 and 4 causes forced vibration of small amplitude of the flexible frame 5, through the intermediary of the connecting member 6. Since the mobile parts are inside the frame, the forced vibration of the frame is principally of the deformable parallelogram type, i.e. the four sections 51, 52, 53 and 54 of the frame are essentially subjected to flexional loads, and not to tensile or compression loads as would be the case if the mobile parts were outside the frame. The four sections being flexionally flexible, the fixed part 1 receives only very small alternating loads due to the alternating deformation of the frame 5 through the intermediary of the connecting member 7. The alternating loads received by the fixed part are principally a force r and a torque c the respective magnitudes of which are very much less than those of the shear force R and of the bending moment C applied by the resonator 3 to each of the mobile parts 2 and 4. For example, loads r and c one hundred times smaller than the respective loads R and C can be obtained.

Accordingly, the flexibility of the frame 5 and the location of the two mobile parts 2 and 4 inside the frame characterize a mechanical filter between the resonator 3 and the fixed part 1 of the transducer, said fixed part being affected very little by the vibrations of the resonator. There is therefore practically no degradation of the quality factor Q of the resonator and the accuracy of the measurement provided by the transducer is thereby improved.

Still referring to FIG. 6A, the coupling members 6 and 7 are subject to alternating and principally flexional deformations parallel to the faces of the plate of material. This is because of the similar magnitudes of the rectangular cross-sections (L6.E) and (L7.E) of the connecting members 6 and 7 transversely to the axis Z'Z and the rectangular cross-sections (L51.E), (L53.E) and (H54.E) of the four sections 51, 52, 53 and 54 of the frame. As a result, the connecting members 6 and 7 have a flexional flexibility which is significantly less than the flexibility of the frame but which nevertheless makes a small contribution to the effective mechanical filtering of the vibrations of the resonator.

The reader will remember that the alternating displacements and deformations whose amplitudes are represented in FIG. 6A constitute the principal vibratory phenomena operating in the transducer. In reality, they coexist with other vibratory phenomena, of lower amplitude, for example alternating rotation of the mobile parts 2 and 4 about the central longitudinal axis Z'Z. This alternating rotation of the mobile parts is caused by flexional vibrations of the resonator 3 and is due to the fact that the mid-plane wherein these vibrations occur does not pass through the axis Z'Z which is a main axis of inertia of the mobile parts 2 and 4. The alternating rotation of the mobile parts generates alternating torsion of the flexible frame 5 about the axis Z'Z, the torsional flexibility of the frame transmitting to the fixed part 1 only a very low alternating torque about the axis Z'Z. This very low torque has only a negligible influence on the effectiveness of the mechanical filtering of the vibrations of the resonator. This torsional aspect will be explained in more detail hereinafter in the context of a torsional vibratory resonator.

More generally, because of the flexibility of the frame 5, the latter effectively filters most of the alternating mechanical loads exerted by the mobile parts 2 and 4 on the connecting member 6. Nevertheless, for more effective mechanical filtering, it is preferable for the mobile parts 2 and 4, the resonator 3, the flexible frame 5 and the connecting members 6 and 7 to have the same plane of symmetry PS perpendicular to the faces of the plate of material and passing through the axis Z'Z, as shown in FIG. 5. In a variant wherein there is no such symmetry, whether as a matter of deliberate choice or as a result of imperfections of manufacture, the alternating mechanical loads transmitted through the fixed part 1 are of greater magnitude than those corresponding to the symmetrical implementation, but in general substantially lower than the magnitudes of the lower alternating loads R and C applied by the resonator 3 to each of the mobile parts 2 and 4. The above remarks show that the effectiveness of the mechanical filtering is relatively tolerant to manufacturing imperfections and that the transducer of the invention is well suited to manufacture at low cost.

The embodiment of the transducer shown in FIG. 5 can equally well accommodate a resonator 3 subject to flexional vibration in the plane PS, i.e. transversely to the faces of the plate of material.

In this case, the alternating mechanical loads applied by the resonator to the mobile parts 2 and 4 are parallel to the plane PS and said mobile parts are accordingly subjected to small alternating displacements the main component of which is a translation perpendicular to the faces of the plate of material. Through the intermediary of the connecting member 6, these small alternating displacements of the mobile parts cause alternating deformation of low amplitude of the flexible frame 5, the sections 51 and 52 of which are deformed principally in bending parallel to the plane PS and the sections 53 and 54 of which are deformed principally in torsion about their respective central longitudinal axes. The four sections 51, 52, 53 and 54 being flexionally and torsionally flexible, the fixed part 1 receives only very low alternating loads due to the alternating deformation of the frame 5 through the intermediary of the connecting member 7. The magnitudes of the alternating loads received by the fixed part are very much lower than those of the loads applied to the mobile parts 2 and 4 by the resonator 3. Accordingly, in a similar way to the resonator subject to flexional vibration parallel to the faces of the plate of material, the fixed part 1 is only very slightly affected by the vibrations of the resonator so that there is practically no degradation of the quality factor Q of the latter.

Figure 6B:
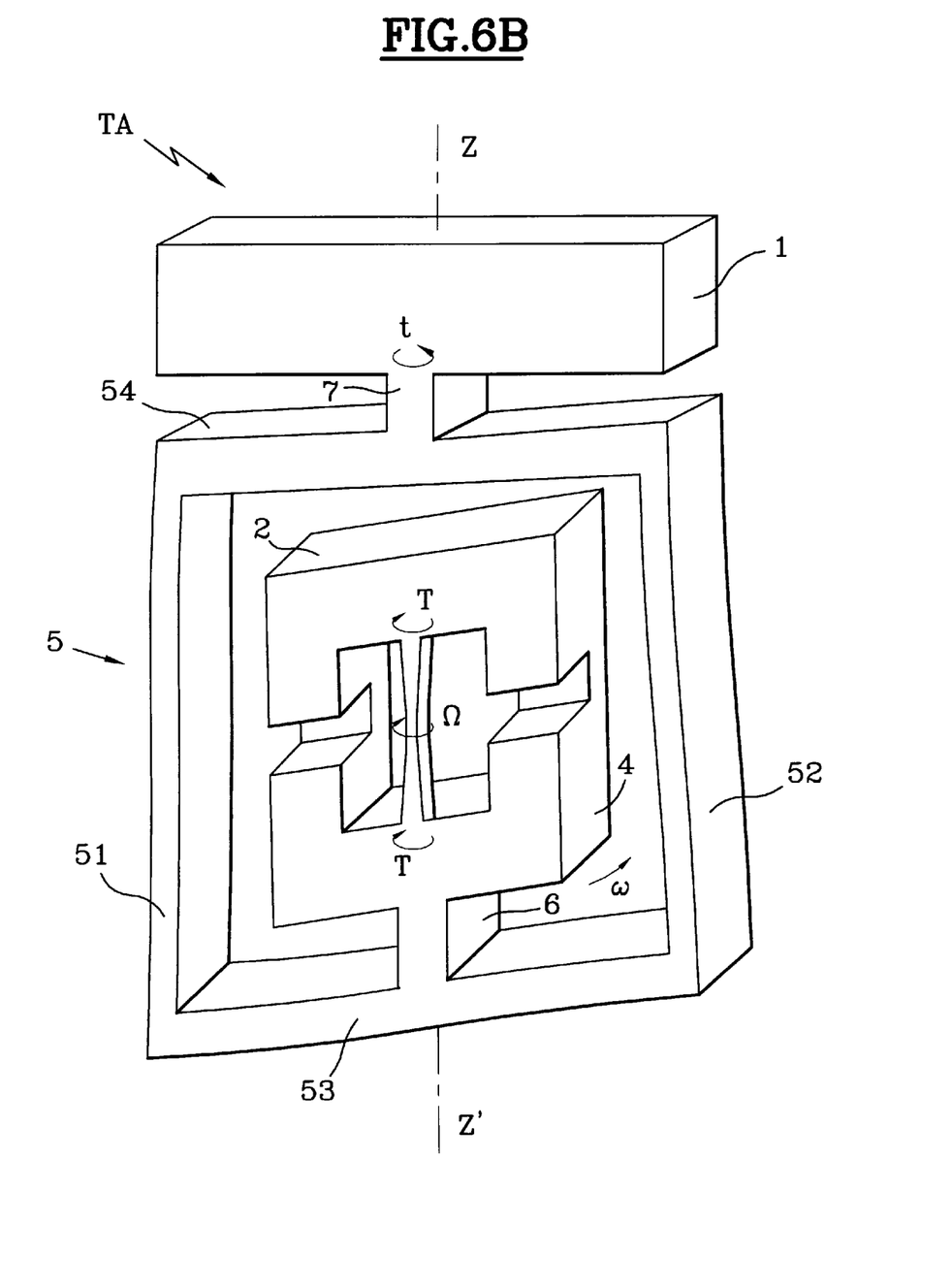

FIG. 6B is a perspective view of the transducer TA from FIG. 5 when the resonator 3 is subject to flexional vibration about its central longitudinal axis parallel to the axis Z'Z. As in FIG. 6A, the deformations of the resonator 3, the flexible frame 5 and the connecting members 6 and 7 correspond to amplitudes of vibration and have been exaggerated to make the drawing easier to understand.

When the resonator 3 is subject to torsional vibration at the resonant frequency it applies, at its built-in ends, an alternating torque T to each of the mobile parts 2 and 4 which accordingly are subjected to alternating displacements the main component ω of which is a rotation about the axis Z'Z which is a main axis of inertia of said mobile parts. To make the drawing easier to understand the rotation ω of the mobile parts has been shown as being substantially as large as the amplitude Ω of the torsional vibration of the resonator. In reality, ω is much smaller than Ω, as the rotational inertia of the mobile parts is much greater than the torsional inertia of the resonator. Through the intermediary of the connecting member 6, this small rotation ω of the mobile parts around the axis Z'Z causes low-amplitude forced vibration of the flexible frame 5, which is deformed in torsion about the axis Z'Z. This torsional distortion of the frame mainly comprises, for each of the sections 51, 52, 53 and 54 of the frame, torsional deformation about its central longitudinal axis and flexional deformation perpendicularly to the faces of the plate of material. The four sections being flexible in torsion and in flexion, the fixed part 1 receives only very low alternating loads due to the alternating deformation of the frame 5 via the connecting member 7. The alternating loads received by the fixed part are mainly a torque t the magnitude of which is very much less than that of the torque T applied to each of the mobile parts 2 and 4 by the resonator 3. The fixed part 1 is therefore only very slightly affected by the vibrations of the resonator, and there is therefore practically no degradation of its quality factor Q.

Still referring to FIG. 6B, the connecting members 6 and 7 are subject to alternating deformation principally in torsion about the axis Z'Z. The torsional flexibility of the coupling members, although significantly less than that of the flexible frame, makes a small contribution to the effectiveness of the mechanical filtering of vibrations of the resonator.

In a similar manner to the flexional vibratory resonator, it is also preferable for the mobile parts 2 and 4, the resonator 3, the flexible frame 5 and the connecting members 6 and 7 to have the same plane of symmetry PS as shown in FIG. 5, so that the mechanical filtering of the torsional vibrations is as effective as possible.

Thanks to the flexible frame 5, leakage of energy towards the fixed part 1 at the resonant frequency of the resonator 3 (a few tens of kHz) is reduced as much for flexional vibrations as for torsional vibrations. However, the mechanical strength of the transducer is not degraded in the working frequency band (from D.C. up to a few hundred kHz).

Figure 7A:
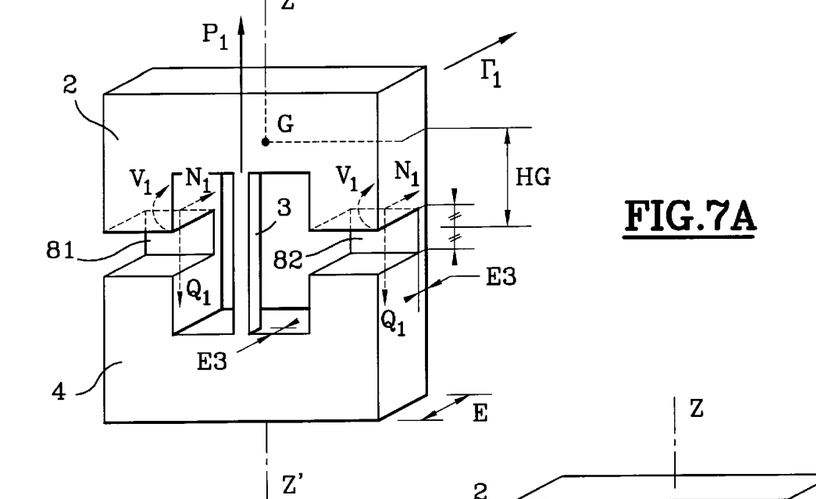
FIGS. 7A, 7B and 7C are perspective views of the mobile parts and of the resonator of the transducer from FIG. 5 showing mechanical loads generated by each of the respective three spatial components of the acceleration.
Figures 7B, 7C:
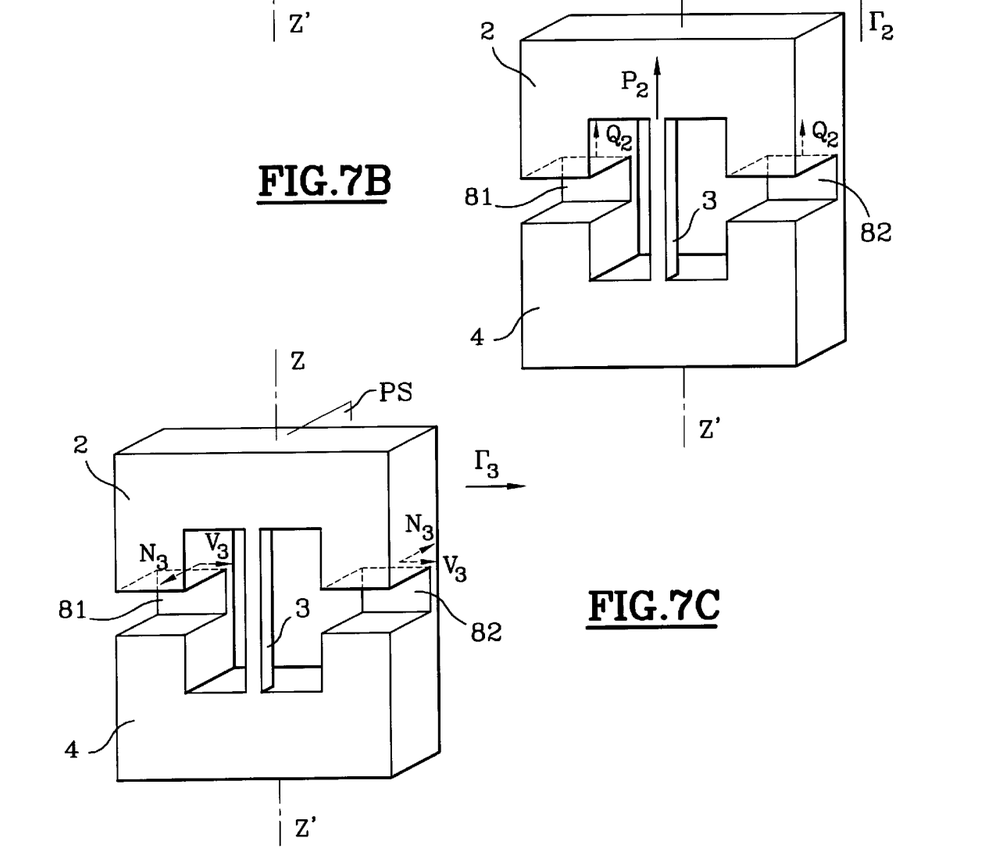

FIGS. 7A, 7B and 7C are fragmentary perspective views of the transducer TA from FIG. 5, limited to the resonator 3, the blades 81 and 82 and the mobile mass parts 2 and 4, the intention being to show the main mechanical loads exerted by the mobile part 2 on the resonator and the blades when the transducer is subjected to each of the three spatial components of acceleration. With reference to these mechanical loads exerted by the mobile part 2, the parts that are not shown, i.e. the fixed part 1, the flexible frame 5 and the two connecting members 6 and 7, have practically no influence, and the mobile part 4 can therefore be regarded as directly fixed for example to a base.

Referring to FIG. 7A, the acceleration $\Gamma_1$ applied perpendicularly to the faces of the plate of material applies to the resonator 3 a longitudinal tensile force $P_1$ and, to each of the blades 81 and 82, a longitudinal compression force $Q_1$, a transverse flexion force $N_1$ and a transverse flexion torque $V_1$. Other mechanical loads (not shown) are exerted by the mobile part 2 on the resonator and the blades, but their role is not essential to the operation of the transducer. These other forces are ignored here to simplify the description of the phenomena.

The expression for the force $P_1$ is obtained by solving a system of equations which represents the equilibrium of the mobile part 2 and the mechanical behavior of the blades 81 and 82. A force is obtained proportional to the acceleration $\Gamma_1$ and substantially equal to:

$$P_1 = [HG/(E-E3)]M\Gamma_1$$

where

HG is the distance between two planes perpendicular to the axis Z'Z, the first plane lying halfway along the blades 81 and 82 and the second plane passing through the center of gravity G of the mobile part 2, and M is the mass of the mobile part 2.

The ratio [HG/(E-E3)], the multiplier coefficient of $M\Gamma_1$ in the expression for the force $P_1$, can be as high as several units, for example five.

It will be noticed that the expression for the force $P_1$ is an algebraic expression, which translates the fact that the force $P_1$ changes direction, so as to become a longitudinal compression force on the resonator 3, when the acceleration $\Gamma_1$ changes direction.

The tensile or compression force $P_1$ which acts on the resonator causes a variation $(\Delta F)_1$ in its resonant frequency F, an increase or a decrease, respectively :

$$(\Delta F)_1 = kP_1 = k[HG/(E-E3)]M\Gamma_1$$

where k is a coefficient dependent on the nature of the vibration of the resonator, for example flexion or torsion, the geometry of the resonator and the characteristics of the material, for example quartz or silicon.

The variations in the frequency F are proportional to the acceleration $\Gamma_1$ applied perpendicularly to the faces of the plate of material. For example, it is possible to obtain a frequency variation of 20 Hz/g for a resonator subject to flexional vibration at 50 000 Hz and a transducer designed to measure up to 100 g. With reference to FIG. 5, the dimensions of the monolithic body of this transducer are H1+H7+H5=6 mm, L=4 mm and E=0.4 mm.

Referring to FIG. 7B, the acceleration $\Gamma_2$ applied parallel to the axis Z'Z principally applies to the resonator 3 a longitudinal tensile force $P_2$ substantially equal to $(\frac{1}{2})M\Gamma_2$ and to each of the blades 81 and 82 a longitudinal force $Q_2$ substantially equal to $(\frac{1}{4})M\Gamma_2$. These forces change direction when the acceleration $\Gamma_2$ changes direction.

In a similar manner to the previous situation of the acceleration $\Gamma_1$, the tensile or compression force $P_2$ which acts on the resonator causes a variation $(\Delta F)_2$ in its resonant frequency F, an increase or a decrease, respectively $$(\Delta F)_2 = kP_2 = k(\frac{1}{2})M\Gamma_2$$

The frequency variation $(\Delta F)_2$ is generally less than the frequency variation $(\Delta F)_1$ for the same magnitude of the accelerations $\Gamma_1$ and $\Gamma_2$. Thus, reverting to the previous example of $(\Delta F)_1=20$ Hz/g, it is possible to obtain $(\Delta F)_2=2$ Hz/g.

Referring to FIG. 7C, the acceleration $\Gamma_3$ applied perpendicularly to the plane PS of the transducer principally applies forces $N_3$ and $V_3$ perpendicular to the axis Z'Z to each of the blades but applies virtually no tensile or compression force to the resonator. As a result there is practically no frequency variation $(\Delta F)_3$ of its frequency F.

Knowing the variations of the frequency F of the resonator for the three components $\Gamma_1$, $\Gamma_2$ and $\Gamma_3$ of the acceleration, it is advantageous to combine two transducers of the invention. The position of the second transducer is deduced from that of the first transducer by rotation through 180° about an axis parallel to the axis Z'Z and the fixed parts of the two transducers are attached to a common base. This combination of two transducers in accordance with the invention constitutes a differential output accelerometer the sensitive direction of which is perpendicular to the faces of the two plates of material and has the advantage, compared to prior art differential accelerometers, of eliminating mechanical coupling between the vibrations of the resonators included in the two transducers. Thus said vibrations no longer disturb each other, which improves the accuracy of the differential frequency measurement and therefore the accuracy of the acceleration deduced therefrom. These aspects of combining two transducers of the invention in this way are explained in more detail hereinafter.

FIGS. 8A, 8B, 8C, 8D and 8E show other embodiments of transducers in accordance with the invention.

Figure 8A:
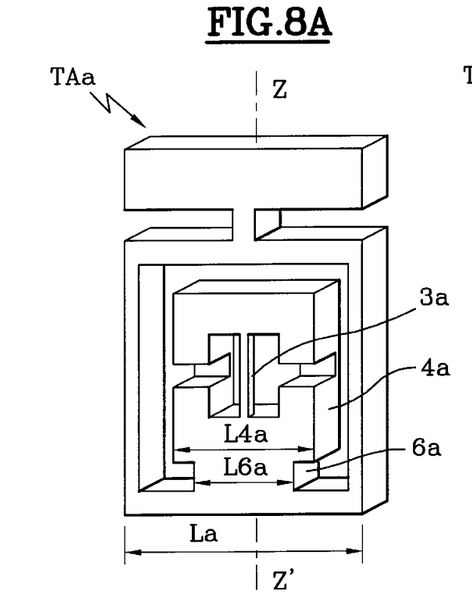
FIGS. 8A, 8B and 8C are perspective views of accelerometric transducers constituting other embodiments of the invention with the emphasis on the mechanical robustness of the transducer.

Referring to FIG. 8A, a transducer TAa differs from the transducer TA of FIG. 5 in that a connecting member 6a has a dimension L6a in the direction of the width La of the transducer TAa significantly greater than the dimension L6. The dimension L6a is significantly less than the dimension L4a of the mobile part 4a of the transducer TAa in the direction of La. The benefit of this embodiment is the increased mechanical robustness of the monolithic body of the transducer conferred by the high stiffness of the connecting member 6a of the transducer TAa and therefore the higher natural frequency of the transducer body. Counteracting this advantage, the mechanical filtering of the vibrations of the resonator 3a of the transducer TAa is less effective than that of the resonator 3 of the transducer TA, but nevertheless is significantly greater than those of prior art accelerometers.

Figure 8B:
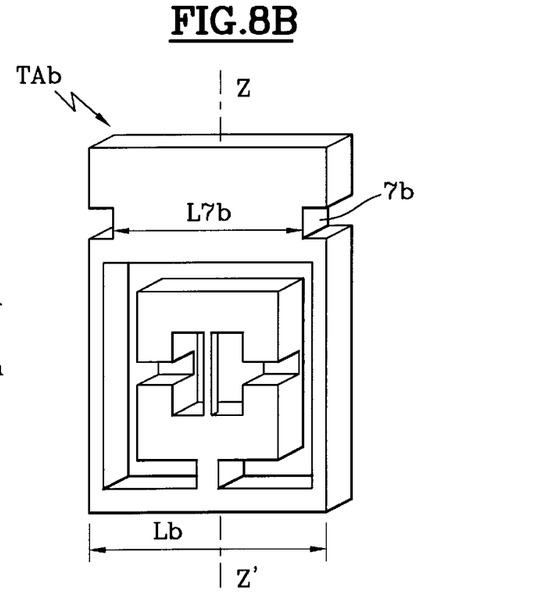

FIG. 8B shows a transducer TAb which differs from the transducer TA of FIG. 5 in that a connecting member 7b has a dimension L7b in the direction of the width Lb of the transducer TAb substantially less than the width Lb of the transducer. The advantages and disadvantages of this third embodiment compared to the transducer TA are substantially the same as those of the transducer TAa from FIG. 8A.

Figure 8C:
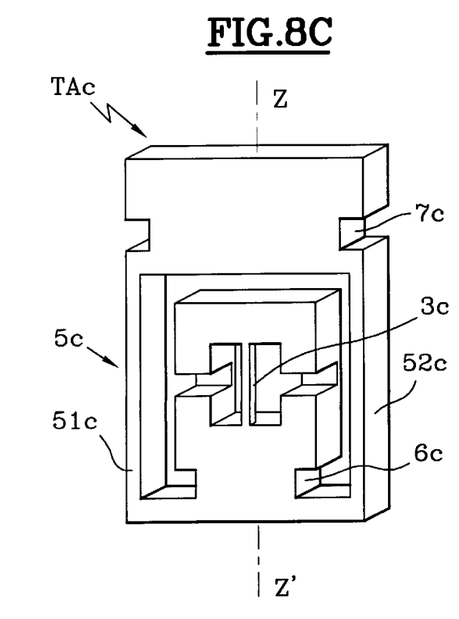

In applications where the mechanical robustness is an essential criterion, it is beneficial to implement a transducer TAc as shown in FIG. 8C, wherein two connecting members 6c and 7c are the same shape as the connecting member 6a of the transducer TAa from FIG. 8A and the connecting member 7b of the transducer TAb from FIG. 8B, respectively. Mechanical filtering of the vibrations of the resonator 3c of the transducer TAc is therefore procured almost entirely by the flexibility of the sections 51c and 52c of the frame 5c of the transducer TAc alone, although it remains more effective than those of prior art accelerometers.

Figure 8D:
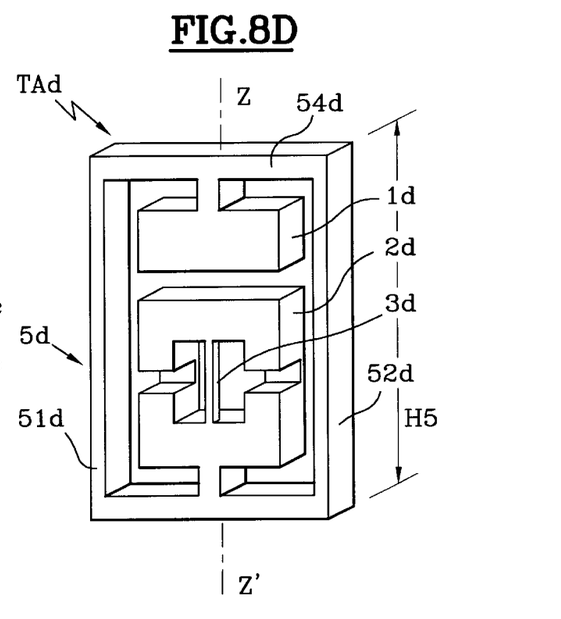
FIG. 8D is a perspective view of an accelerometric transducer constituting a further embodiment of the invention with the emphasis on miniaturization.

FIG. 8D shows a transducer TAd more particularly designed for applications wherein miniaturization is an important criterion. The transducer TAd differs from the transducer TA of FIG. 5 primarily in the disposition of the fixed part 1d within the flexible frame 5d and between the frame section 54d and the mobile part 2d of the transducer TAd. Thus said frame 5d constitutes the contour of the transducer TAd. This disposition reduces the size of the transducer whilst retaining a sufficient length H5 of the frame sections 51d and 52d for them to retain the flexibility required to achieve very good mechanical filtering of the vibrations of the resonator 3d of the transducer TAd.

The effectiveness of the mechanical filtering of the vibrations of the resonator is therefore due in large part to the flexibility of the two flexible frame sections parallel to the central longitudinal axis Z'Z of the transducer, i.e. parallel to the axis passing through the ends of the resonator. Compared to the other two sections of the flexible frame and the two connecting members, these two sections have greater flexibility in respect of mechanical stresses caused by the vibrations of the resonator. More generally, correct operation of the transducer of the invention requires at least two flexible sections of substantially parallelepiped shape having their longitudinal axes parallel to the axis passing through the two ends of the resonator. An annular frame, similar to the peripheral part R2 of the prior art resonator shown in FIG. 4, might not lead to correct operation of the transducer of the invention.

Figure 8E:
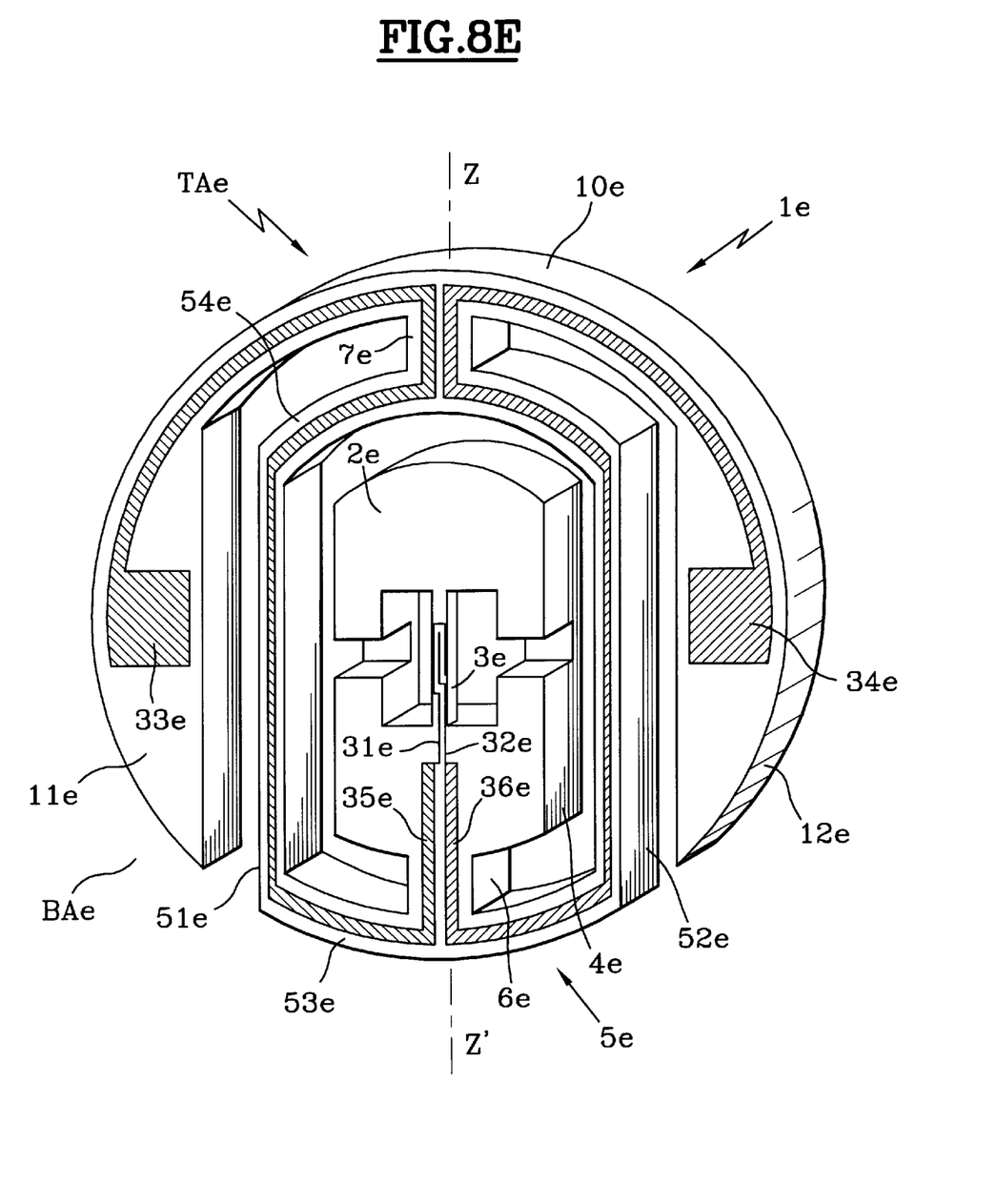
FIG. 8E is a perspective view of an accelerometric transducer constituting a further embodiment of the invention, with vibration inducing means with the emphasis on a flexional vibratory resonator

FIG. 8E shows a transducer TAe with a monolithic quartz body. The means for imparting vibration to the resonator 3e in the transducer TAe are similar to those of the vibrating blades $3_1$ and $3_2$ of the first prior art accelerometer CA' shown in FIG. 1 and therefore particularly suitable for flexional vibrations parallel to the faces of the plate of material. The transducer TAe differs from the transducer TA in FIG. 5 principally in its disk-like general shape, the part-ring shape of the sections 53e and 54e of the flexible frame 5e, and the U-shape of the fixed part 1e. This fixed part includes a base section 10e in the shape of part of a ring running substantially along the section 54e of the flexible frame and fastened to the connecting member 7e, and two branches 11e and 12e in the form of discoid segments extending substantially along the sections 51e and 52e of the frame and from the ends of the base section 10e, respectively. Accordingly, the flexible frame 5e is disposed inside the U-shape of the fixed part 1e.

The branches 11e and 12e are fixed, for example glued, to a case base BAe.

The U-shape of the fixed part 1e of the transducer TAe has the following advantages compared to the parallelepiped shape of the fixed part 1 of the transducer TA shown in FIG. 5:

for the same overall size of the case, the plane on which the transducer TAe fits to the base BAe is more clearly defined;

if it is necessary to increase the mechanical robustness of the transducer, it is convenient to use two flanges that bear on the faces of the discoid branches 11e and 12e and which limit to a predetermined value the displacement of the mobile mass part 2e;

fixing the transducer TAe to the base BAe is facilitated by the fact that, the center of mass of the transducer being located between its surfaces bearing on the base, it is not necessary to use a device to retain the transducer on the base.

With reference to mechanical filtering of flexional vibrations of the resonator 3 of the transducer TAe, the effectiveness of the transducer TAe is substantially equivalent to that of the transducer TA, given the sufficient flexibility of the sections 51e and 52e.

As shown in FIG. 8E, the means for imparting vibration to the resonator 3e are in the form of two metal electrodes 31e and 32e having opposite polarities and exciting flexional vibrations of the resonator 3e by piezoelectric effect. The electrodes 31e and 32e are disposed on the side of the resonator 3e facing towards the exterior of the transducer body and their "three track" configuration is described in French patent application No. 2,685,964 in the name of the applicant. Electrical connections between the electrodes 31e and 32e and sealed feed-throughs (not shown) in the case base are provided at the level of the fixed branches 11e and 12e, by welding to respective metal contact pads 33e and 34e of substantially rectangular shape. As shown in FIG. 8E, the metal pads 33e and 34e are connected to the respective electrodes 31e and 32e by respective metal conductor strips 35e and 36e supported by the visible face of the mobile part 4e, the flexible frame 5e, the connecting members 6e and 7e and the base section 10e.

The electrodes, the connecting strips and the contact pads can be obtained simultaneously by etching a metal layer adhering to the visible face of the quartz plate using conventional photolithographic processes. The adherent metal layer may advantageously be that previously used as a protective mask for machining the monolithic transducer body.

The sealed feed-throughs of the base of the casing connected to the electrodes 31e and 32e are electrically connected to the two terminals of an oscillator circuit (not shown) at the output of which there is produced an alternating signal having frequency variations reflecting variations of the acceleration applied to the transducer.

As previously indicated, the invention also concerns a differential output accelerometer including two accelerometric transducers of the invention, the position of the second transducer being deduced from that of the first transducer by rotation through 180° about an axis parallel to the axis passing through the two ends of the resonator, the fixed parts of the two transducers being fastened to a common base. In the embodiments shown in FIGS. 5, 8A, 8B, 8C, 8D and 8E, the axis passing through the ends of the resonator is parallel to the axis Z'Z of the transducer. Accordingly, in the combination of two transducers in accordance with the invention, the position of the second transducer is deduced from that of the first by rotation of 180° about an axis parallel to the axis Z'Z.

Figure 9:
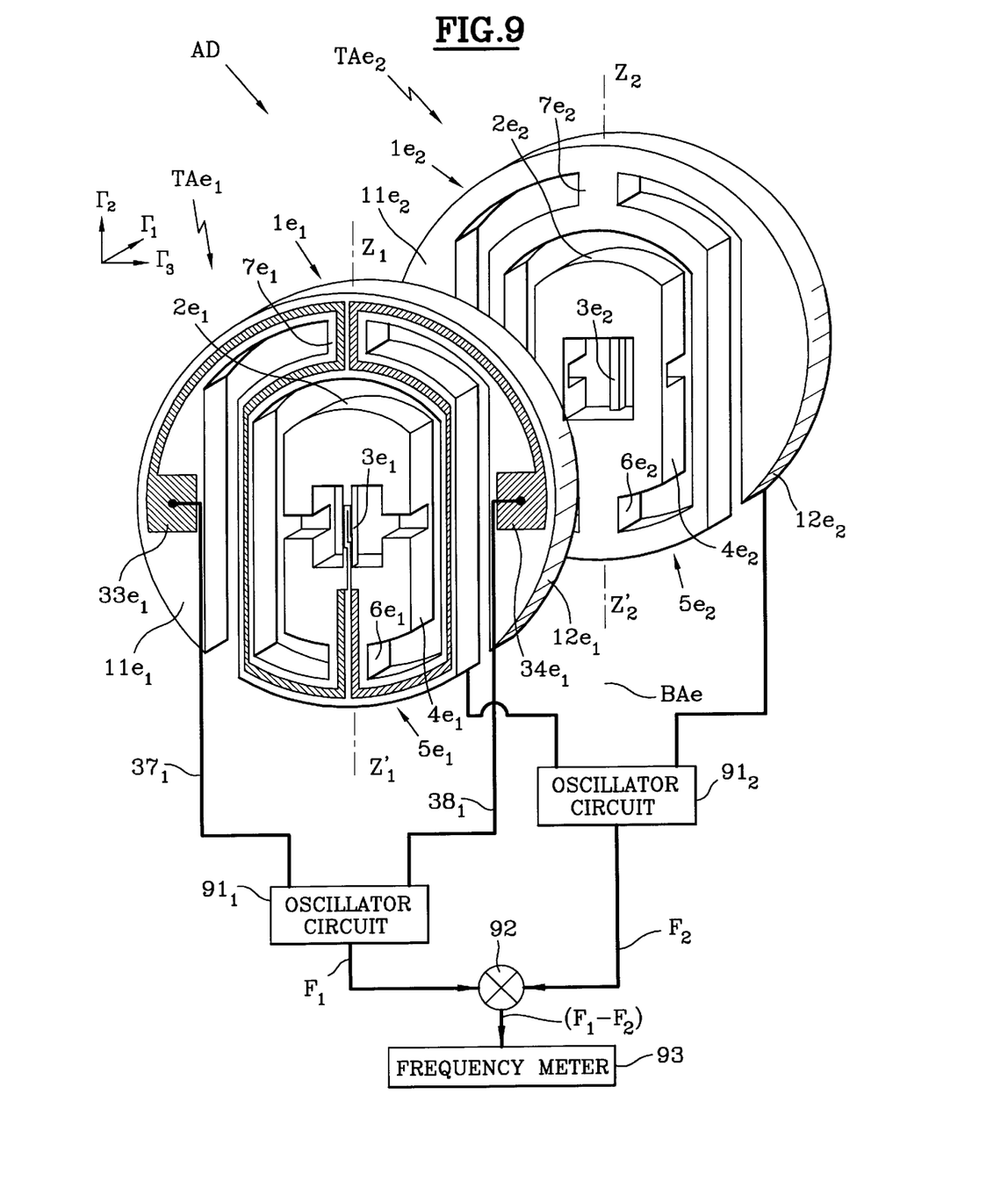
FIG. 9 is a perspective view of a differential accelerometer of the invention comprising two transducers substantially identical to that of FIG. 8E with associated frequency measuring means.

Referring to FIG. 9, a differential accelerometer AD includes two transducers $TAe_1$ and $TAe_2$ that are substantially identical to the transducer TAe shown in FIG. 8E, the discoid branches $11e_1$ and $12e_1$ of the transducer $TAe_1$ and $11e_2$ and $12e_2$ of the transducer $TAe_2$ being fastened to a common base BAe. In the embodiment illustrated in FIG. 9, the transducers $TAe_1$ and $TAe_2$ are symmetrical to each other about a plane parallel to the faces of the two plates of material. This arrangement constitutes a special case of the arrangement in accordance with the invention and must not be regarded as limiting on the invention. Likewise, the transducer TAe has been selected by way of example. The scope of the present patent application encompasses the combination of two transducers substantially identical to any one of the transducers TA, TAa, TAb, TAc and TAd shown in FIGS. 5, 8A, 8B, 8C and 8D, respectively, and more generally to the combination of any two transducers in accordance with the invention.

Referring again to FIG. 9, the metal pads $33e_1$ and $34e_1$ of the transducer $TAe_1$ are connected to two first terminals of an oscillator circuit $91_1$ by means of two conductor wires $37_1$ and $38_1$. The identical arrangement of electrodes, connecting strips and contact pads on the non-visible face of the transducer $TAe_2$ is in relation to a second oscillator circuit $91_2$.

The outputs of the two circuits $91_1$ and $91_2$ are connected to a differential frequency measuring device including a frequency subtractor circuit 92 and a frequency meter 93, the frequency $(F_1-F_2)$ measured by the frequency meter 93 being representative of the acceleration to be measured.

The operation of the differential accelerometer AD is now described in relation to the previous explanations with reference to FIGS. 7A, 7B and 7C.

Referring again to FIG. 9, the acceleration $\Gamma_1$ applied perpendicularly to the faces of the two plates of material applies to the resonators $3e_1$ and $3e_2$ respective longitudinal tensile and compression forces (not shown) which are of the same magnitude if the transducers $TAe_1$ and $TAe_2$ are identical. These longitudinal forces cause an increase $(\Delta F)_1$ in the frequency $F_1$ of the resonator $3e_1$ and a reduction by the same amount in the frequency $F_2$ of the resonator $3e_2$.

The expression for the frequency variation $(\Delta F)_1$ has been written previously as a function of mechanical and geometrical characteristics of the transducer.

The differential frequency $(F_1-F_2)$ is therefore subject to an increase equal to:

$$A(F_1-F_2)=2(\Delta F)_1$$

The acceleration $\Gamma_2$ applied parallel to the axes $Z_1-Z_1$ and $Z_2'Z_2$ of the transducers $TAe_1$ and $TAe_2$ applies to the resonators $3e_1$ and $3e_2$ longitudinal tensile forces (not shown) of the same magnitude which cause the same increase $(\Delta F)_2$ in their resonant frequencies.

Thus the differential frequency $(F_1-F_2)$ is not subject to any variation related to the acceleration $\Gamma_2$.

The acceleration $\Gamma_3$ applied perpendicularly to the two previous acceleration directions does not apply any longitudinal forces to the resonators $3e_1$ and $3e_2$. As a result the frequencies $F_1$ and $F_2$ and therefore the differential frequency $(F_1-F_2)$ are not subject to any variation related to the acceleration $\Gamma_3$.

Accordingly, the sensitive direction of the differential accelerometer AD is perpendicular to the faces of the two plates of material.

Because of the effectiveness of the mechanical filtering of the vibrations of each of the resonators $3e_1$ and $3e_2$, the differential accelerometer AD has two advantages over the prior art accelerometers previously described. Firstly, the quality factor Q of the resonators are not degraded, and, secondly, the mechanical coupling between their vibrations is eliminated. These two advantages improve the accuracy of the accelerometer AD.

Figure 10:
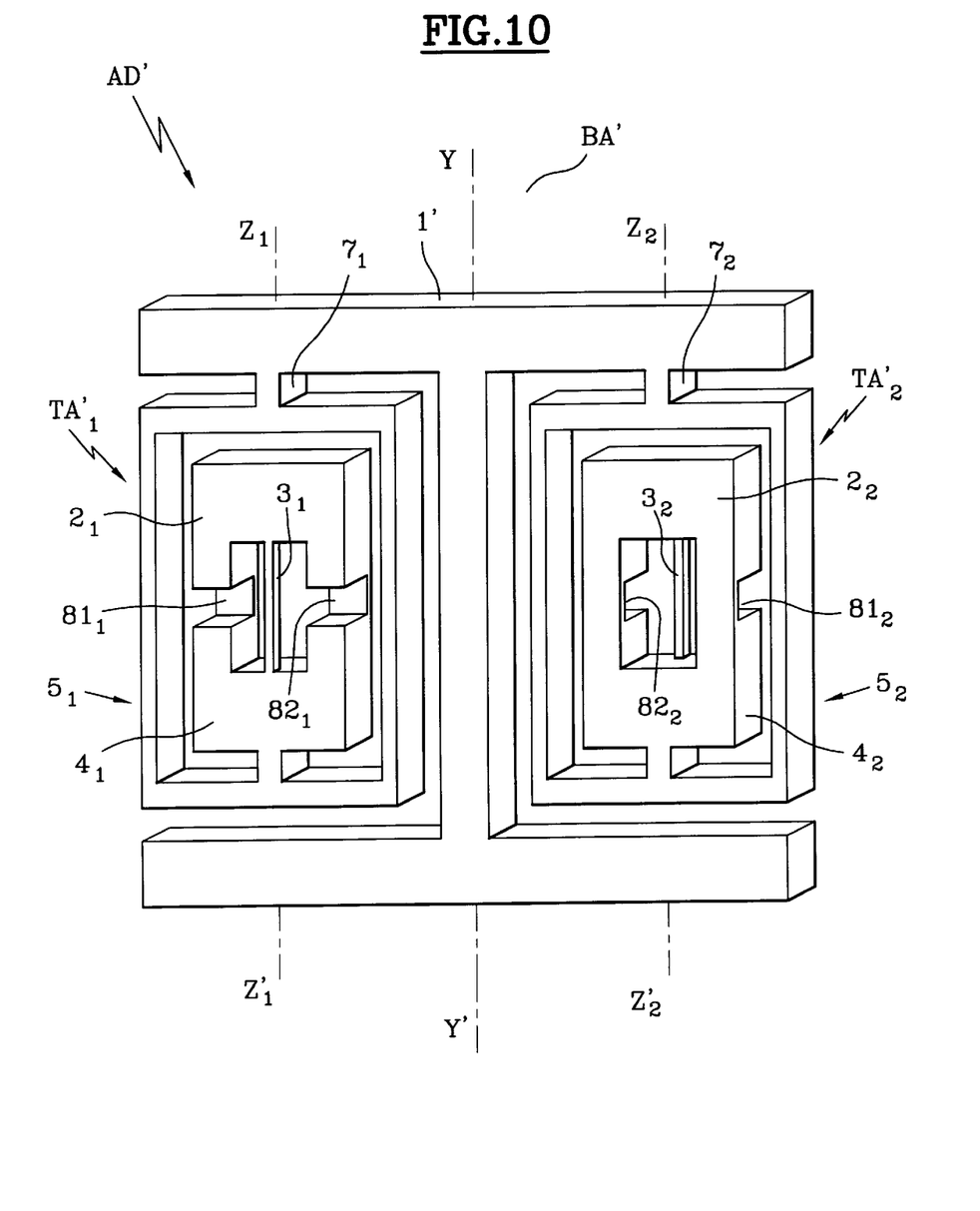
FIG. 10 is a perspective view of a differential accelerometer constituting a different embodiment of the invention, obtained by machining two transducers in one and the same plate of material.

FIG. 10 shows a differential accelerometer AD' including two substantially identical transducers $TA_1'$ and $TA_2'$ made from the same plate of material of uniform thickness. The conformation of these transducers is similar to that of the transducer TA shown in FIG. 5. In the embodiment shown in FIG. 10, the differential accelerometer AD' constitutes a monolithic body which is generally parallelepiped shape. The mobile parts $2_1, 4_1$ and $2_2, 4_2$, the frames $5_1$ and $5_2$ and the fixed part 1' of the two transducers $TA_1'$ and $TA_2'$ have coplanar faces coincident with the two faces of the plate. The resonator $3_1$ of the transducer $TA_1'$ and the blades $81_2$ and $82_2$ of the other transducer $TA_2'$ are flush with one of the two faces of the plate; similarly, the resonator 32 of the other transducer $TA_2'$ and the blades $81_1$ and $82_1$ of the first transducer $TA_1'$ are flush with the other face of the plate. A central axis Y'Y parallel to the faces of the plate constitutes an axis of symmetry of the accelerometer AD'. In the embodiment shown, the longitudinal axes $Z_1'Z_1$ and $Z_2'Z_2$ of the respective transducers $TA_1'$ and $TA_2'$ are parallel to the axis Y'Y and the transducers $TA_1'$ and $TA_2'$ are symmetrical to each other about the axis Y'Y, which constitutes a special case of the arrangement in accordance with the invention. In the illustrated embodiment, the fixed part 1' of the differential accelerometer AD' has an I-shape front contour with a longitudinal branch centred along the axis Y'Y and one of the transverse branches fastened to connecting members $7_1$ and $7_2$ of the transducers $TA_1'$ and $TA_2'$, respectively. The benefits of this I-shape of the fixed part 1' are similar to those of the U-shape of the fixed part 1e of the transducer TAe shown in FIG. 8E: well defined fitting plane, convenience of using two flanges constituting abutments, and easy fixing of said fixed part to a base.

As for the differential accelerometer AD shown in FIG. 9, the sensitive direction of the differential accelerometer AD' is perpendicular to the faces of the plate of material and the advantage of the accelerometer AD' over the prior art accelerometers is its increased accuracy.

Compared to the accelerometer AD, the integration of the accelerometer AD' into a case is simplified, which is advantageous when the criteria of miniaturization and of low cost are decisive.

On the other hand, the accelerometer AD has the advantage of enabling selection of the two transducers constituting it, with the aim of further improving measurement accuracy.

We claim:

1. A monolithic accelerometric transducer comprising
   (a) a fixed part (1);
   (b) first (2) and second (4) spaced mobile mass parts;
   (c) a resonator (3) connected between said first and second mobile parts:
   (d) a hollow flexible frame (5) arranged in spaced relation concentrically about said first and second mobile mass parts and said resonator:

(e) a first connecting member (6) connecting said second mobile mass part with a first part of said frame; and (f) a second connecting member (7) connecting an opposite part of said frame with said fixed part.

2. The transducer according to claim 1, wherein said flexible frame (5) is rectangular and comprises a first pair of opposed sections (51, 52) extending substantially parallel to said resonator (3), and a second pair of opposed sections (53, 54) extending substantially perpendicular to said resonator (3) said second pair of sections being connected with said second mobile mass part (4) and with said fixed part (1) by said first and second connecting members (6, 7), respectively, said first connecting member (6) having a width (L6, L6a) less than the corresponding width (L4, L4a) of said second mobile mass part (4), and said second connecting member (7) having a width (L7, L7b) less than the length of said second pair of sections (53, 54), said widths (L6, L6a; L4, L4a; L7, L7b) being those in the lengthwise direction (L, 30 La, Lb) of said second pair of sections (53, 54), at least one of said connecting members (6, 7) having a cross-sectional area (L6.E; L7.E) in the same order of magnitude as the cross-sectional areas (L51.E, H53.E, H54.E) of said first and second pairs of frame sections.

3. The transducer according to claim 2, wherein said frame lies in a first plane (PM); and further wherein said mobile mass parts (2, 3), said resonator (3), said flexible frame (5) and said connecting members (6, 7) have a common plane of symmetry (PS) perpendicular to said plane (PM) of said frame, said connecting members (6, 7) being located at respective intersections of said frame and said plane of symmetry.

4. A transducer according to claim 1, and further including a pair of coplanar parallel blades (81, 82) arranged on opposite sides of said resonator, said blades being connected between said first and second mobile mass parts.

5. The transducer according to claim 4, wherein said blades (81, 82) have a length (HB) between one tenth and one-half the length (H3) of said resonator.

6. The transducer according to claim 5, wherein said blades (81, 82) are positioned generally opposite the middle of the length (H3) of said resonator (3).

7. The transducer according to claim 4, wherein said blades (81, 82) are flush with a face common to said first and second mobile mass parts (2, 4), said resonator (3) is flush with another face common to the first and second mobile mass parts, and said blades and said resonator have a common width (E8=E3) in the direction of the thickness (E) of said mobile mass parts.

8. The transducer according to claim 1, wherein said fixed part (Id) is arranged inside said frame (5d).

9. The transducer according to claim 1, wherein said fixed part (1e) has a generally U-shaped configuration surrounding said second connecting member (7) and adjacent portions of said frame, said fixed part including an annular base section (10e) having a middle portion fastened to said second connecting member (7e) and two branches (11e, 12e) fastened to respective ends of said base section (10e) to fix said transducer (TAe) to a base (BAe).

10. A transducer according to claim 1, comprising two electrodes (31e, 32e) supported by said resonator (3e), two contact pads (33e, 34e) supported by said fixed part (1e); and two conductor strips (35e, 36e) supported by said second mobile mass part (4e), said first connecting member (6e), said frame (5e), said second connecting member (7e), and said fixed part (1e) for respectively connecting said two electrodes (31e, 32e) with said two contact pads (33e, 34e).

11. An accelerometer, comprising:
(a) first ($TAe_1$; $TA_1'$) and second ($TAe_2$; $TA_2'$) accelerometric transducers each including:
   (1) a fixed part;
   (2) first and second spaced mobile mass parts;
   (3) a resonator connected between said first and second mobile parts;
   (4) a hollow flexible frame arranged in spaced relation concentrically about said first and second mobile mass parts and said resonator;
   (5) a first connecting member connecting said mobile mass part with a first part of said frame; and
   (6) a second connecting member connecting an opposite part of said second frame with said fixed part;
(b) said second transducer having a position that is deduced from that of said first transducer by a rotation of 180° about an axis (Y'Y) parallel to an axis passing through the ends of said resonator ($3e_1$; $3_1$) of said first transducer; and
(c) means for fastening together said fixed parts of said first and second transducers.

12. The accelerometer according to claim 11, wherein said transducers ($TAe_1$, $TAe_1$) are symmetrical to each other about a plane parallel to coplanar faces of said mobile mass parts ($2e_1$, $4e_1$; $2e_2$, $4e_2$) of each of said transducers.

13. The accelerometer according to claim 11, wherein said mobile mass parts ($2_1$, $4_1$, $2_2$, $4_2$), said frames ($5_1$, $5_2$) and said fixed parts ($1_1$, $1_2$) of said transducers ($TA_1'$; $TA_2'$) have coplanar faces, said transducers being symmetrical to each other about an axis (Y'Y) parallel to said coplanar faces.

* * * * *